US012142123B2

(12) United States Patent
Turner

(10) Patent No.: US 12,142,123 B2
(45) Date of Patent: Nov. 12, 2024

(54) SYSTEMS AND METHODS FOR POWER TOOL ACTIVATION WITH PACKAGING INTERFACE SYSTEM

(71) Applicant: Milwaukee Electric Tool Corporation, Brookfield, WI (US)

(72) Inventor: Christopher J. Turner, Lannon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/693,501

(22) PCT Filed: Dec. 15, 2022

(86) PCT No.: PCT/US2022/081642
§ 371 (c)(1),
(2) Date: Mar. 19, 2024

(87) PCT Pub. No.: WO2023/114902
PCT Pub. Date: Jun. 22, 2023

(65) Prior Publication Data

US 2024/0273985 A1 Aug. 15, 2024

Related U.S. Application Data

(60) Provisional application No. 63/290,989, filed on Dec. 17, 2021.

(51) Int. Cl.
*G08B 13/24* (2006.01)
*B25H 3/02* (2006.01)

(52) U.S. Cl.
CPC ......... *G08B 13/2405* (2013.01); *B25H 3/021* (2013.01)

(58) Field of Classification Search
CPC ...... G08B 13/2405; B25H 3/021; B25H 3/02; B25F 5/00; B65D 50/00; G06K 7/10366;
(Continued)

(56) References Cited

U.S. PATENT DOCUMENTS

| | | | | |
|---|---|---|---|---|
| 6,104,281 A * | 8/2000 | Heinrich | G08B 13/1409 340/10.5 |
| 2012/0176244 A1* | 7/2012 | Niederhuefner | G08B 15/02 340/568.1 |
| 2022/0156412 A1* | 5/2022 | Davis | G07G 1/0009 |

FOREIGN PATENT DOCUMENTS

| | | |
|---|---|---|
| EP | 2418052 A2 | 2/2012 |
| EP | 3189943 A1 | 7/2017 |

(Continued)

OTHER PUBLICATIONS

ISR and Written Opinion from related PCT/US2022/081642, mailed May 15, 2023, 14 pages.

*Primary Examiner* — Joseph H Feild
*Assistant Examiner* — Sharmin Akhter
(74) *Attorney, Agent, or Firm* — Quarles & Brady LLP

(57) ABSTRACT

A power tool system and method are provided that includes a power tool device having a body, a terminal interface coupled to the body, and an electronic controller coupled to the body. The system further includes packaging containing the power tool device, and a packaging interface system. The packaging interface system includes a connection port and a power tool device connector. The connection port is exposed external to the packaging and receives a security command, for example, from a reusable adapter in communication with a point of sale device. The power tool device connector selectively engages with the terminal interface and provides a communication path between the connection port and the terminal interface. The electronic controller of the power tool device receives the security command from the pack- (Continued)

aging interface system via the power tool device connector, and unlocks the power tool device in response to the security command.

20 Claims, 10 Drawing Sheets

(58) Field of Classification Search
CPC ............ G06K 7/0008; G06K 7/10009; G06K 19/0723; G06K 7/01
See application file for complete search history.

(56) References Cited

FOREIGN PATENT DOCUMENTS

| | | | |
|---|---|---|---|
| EP | 3706088 | A1 | 9/2020 |
| EP | 3881975 | A1 | 9/2021 |
| WO | 2021/127347 | A1 | 6/2021 |

* cited by examiner

SYSTEMS AND METHODS FOR POWER TOOL ACTIVATION WITH PACKAGING INTERFACE SYSTEM

RELATED APPLICATIONS

The present application is a U.S. 371 national stage entry of International Application No. PCT/US2022/081642, filed Dec. 15, 2022, which is based on and claims priority from U.S. Patent Application No. 63/290,989, filed on Dec. 17, 2021, the entire disclosure of which is incorporated herein by reference.

BACKGROUND

Work tools (e.g., power tools) allow operators to implement various functionalities on many different components (e.g., electrical wires, power cables, sheet metal, etc.). For example, some power tools can include a cutting head that is driven (e.g., hydraulically, or electrically) into a component, such as a power wire, to cut through the component.

SUMMARY

Some embodiments of the disclosure provide a power tool system. The power tool system can include a power tool device, packaging containing the power tool device, and a packaging interface system. The power tool device includes a body, a terminal interface coupled to the body, and an electronic controller coupled to the body. The packaging interface system includes a connection port and a power tool device connector. The connection port is exposed external to the packaging, and the connection port configured to receive a security command. The power tool device connector is selectively engaged with the terminal interface and provides a communication path between the connection port and the terminal interface. The electronic controller of the power tool device is configured to receive the security command from the packaging interface system via the power tool device connector; and unlock the power tool device in response to the security command.

Some embodiments of the disclosure provide a method for activating a power tool device following a verified power tool device purchase. The method can include receiving, by a connection port of a packaging interface system, a security command. The connection port is exposed external to packaging that contains the power tool device, and the power tool device includes a body, a terminal interface, and an electronic controller. The method further includes receiving, by the electronic controller, the security command from the packaging interface system via a power tool device connector of the packaging interface system. Here, the power tool device connector is selectively engaged with the terminal interface and provides a communication path between the connection port and the terminal interface. The method further includes unlocking, by the electronic controller, the power tool device in response to the security command.

Some embodiments of the disclosure provide a power tool system. The power tool system can include a power tool, packaging containing the power tool, and a packaging interface system. The power tool includes a body, a battery pack interface coupled to the body, and an electronic controller coupled to the body. The packaging interface system includes a connection port and a tool connector. The connection port is exposed external to the packaging, and the connection port configured to receive a security command. The tool connector is selectively engaged with the battery pack interface and provides a communication path between the connection port and the battery pack interface. The electronic controller of the power tool is configured to receive the security command from the packaging interface system via the tool connector; and unlock the power tool in response to the security command.

Some embodiments of the disclosure provide a method for activating a power tool following a verified power tool purchase. The method can include receiving, by a connection port of a packaging interface system, a security command. The connection port is exposed external to packaging that contains the power tool, and the power tool includes a body, a battery pack interface, and an electronic controller. The method further includes receiving, by the electronic controller, the security command from the packaging interface system via a tool connector of the packaging interface system. Here, the tool connector is selectively engaged with the battery pack interface and provides a communication path between the connection port and the battery pack interface. The method further includes unlocking, by the electronic controller, the power tool in response to the security command.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1:
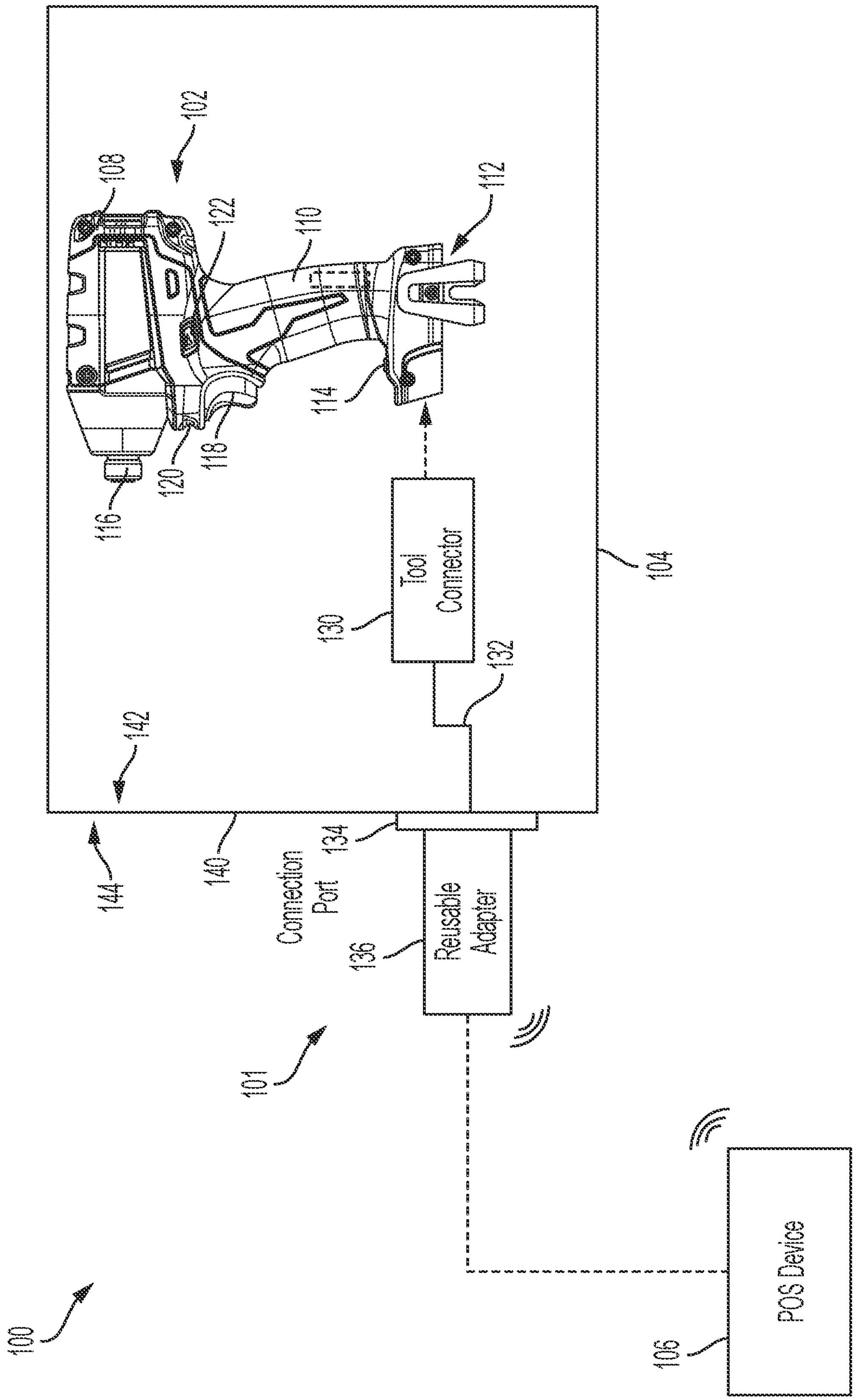
FIG. 1 is a schematic illustration of an anti-theft system including a packaging interface system.

As described above, power tools can generally implement various functionalities on different components or workpieces. For example, power tools can include an actuator including a moveable component that when moved into contact with the component, implements some kind of functionality on the component. For example, such as when the power tool is implemented as a cutting tool, the actuator of the cutting tool can include a cutting head that can, when moved into contact with a work piece (e.g., a wire to be cut) sever the work piece in two. As another example, such as when the power tool is implemented as a crimping tool, the actuator of the crimping tool can include a crimping head that can, when moved into contact with a work piece (e.g., a wire to be crimped), crimp the work piece (e.g., to create an electrical connection to the wire). As another example, such as when the power tool is implemented as a drill-driver, the actuator of the drill-driver can include a drill bit that can, when moved into contact with a work piece (e.g., a piece of wood), drill a hole in the workpiece. As another example, such as when the power tool is implemented as a drill-driver, the actuator of the drill-driver can include a driver bit that can, when moved into contact with a fastener (e.g., a screw) engaging a work piece (e.g., a piece of wood or metal), drive the fastener into the workpiece or remove the fastener from the workpiece, depending on the direction of rotation of the actuator.

Some power tools can include an electronic controller that can control various features of the tool. For example, the electronic controller can drive extension (or rotation) of the actuator to implement a functionality on a work piece, or can drive retraction (or rotation in the opposing direction) of the actuator (e.g., after the functionality has been completed). In some cases, the electronic controller of the power tool can receive data from sensors of the power tool, which can augment the control of the actuator. For example, one sensor can be configured to sense actuation of a trigger that is coupled to the power tool and, when the sensor indicates to the electronic controller that the trigger is actuated (e.g., by an operator), the electronic controller causes the actuator to extend to implement the functionality.

In some cases, power tools (e.g., especially those that are valuable including large hydraulic power tools) can be stolen from a point of sale location such as a retail store. These instances of stealing can be a burden for retail stores, resulting in significant losses in revenue and extra personnel (and other anti-theft) resources to attempt to thwart stealing of these power tools. To address this problem, after a verified purchase of the power tool, a wireless device (e.g., owned by the retail store) may communicate with a wireless module of the power tool to instruct the wireless module to transmit an unlocking command to an electronic controller of the power tool. However, because the wireless module may continuously scan for responses from the wireless device and/or the power tool, the wireless module may drain a battery powering the wireless module. If the battery is drained before a valid purchase, the battery may need to be replaced and/or the wireless module may not be powered and able to effect the unlocking at the point of a verified purchase. In addition, power tools without such a wireless module could not be locked and unlocked using these techniques, leaving these power tools at risk of theft.

Some embodiments described herein provide solutions to these problems (and others) by providing improved systems and methods for activating a power tool following a verified purchase of a power tool. For example, some embodiments of the disclosure provide an anti-theft system that can include a power tool having a battery pack interface and a packaging interface system providing a point of sale (POS) device communication access to a power tool contained by packaging. For example, the power tool can receive power and communications via the packaging interface system from an adapter that connects to the packaging interface system via a connection port exposed external to the packaging. By connecting to the battery pack interface, the packaging interface system can be universal for all power tools having a similarly structured battery pack interface. In this way, the power tools do not have to be redesigned or restructured to accommodate the packaging interface system (e.g., the hardware of the power tools can remain the same), and in fact, this packaging interface system can expand the use of anti-theft verification for other power tools that were previously not intended to include anti-theft verification (e.g., lower cost power tools). In addition, by providing the adapter with communication capabilities for communicating with a POS device and, optionally, a power source for powering the power tool for communications used to unlock or lock the tool, more expensive components of the packaging interface system found in the adapter may be reused for purchase verification for many power tools. Additionally, the power source of the adapter (and, ultimately, the power tool during the purchase authentication and unlocking) may be replaced without needing to open the packaging containing the power tool.

FIG. 1 shows a schematic illustration of an anti-theft system 100 including a packaging interface system 101. The anti-theft system 100 can further include a power tool 102, packaging 104, and a point of sale ("POS") device 106. The power tool 102 can be implemented in different ways. For example, the power tool 102 can include an actuator, a power source (e.g., a battery pack), an electronic controller, a power source interface (e.g., a battery pack interface), etc. As shown in FIG. 1, the power tool 102 is illustrated as an impact driver, however, the power tool 102 can be implemented as other types of power tools including, for example, an impact wrench, a power drill, a hammer drill, a pipe cutter, a sander, a nailer, a grease gun, a crimper, etc. The power tool 102 can include a body 108, a handle 110, a battery pack interface 112 (also referred to as a terminal interface), a mode pad 114, an output drive device 116, a trigger 118, a work light 120, and a forward/reverse selector 122. The housing of the power tool 102 (e.g., the body 108 and the handle 110) can be composed of a durable and light-weight plastic material. The drive device 116 can be composed of a metal (e.g., steel), and can be a socket (or other structure specifically designed for the task associated with the particular power tool). The battery pack interface 112 can be configured to receive and couple to a battery, which can provide power to the power tool 102 (e.g., after the power tool 102 has been unlocked). The battery pack interface 112 can include a connecting structure to engage a mechanism that secures the battery pack and a terminal block to electrically connect the battery pack to the power tool 102. In some cases, the mode pad 114 allows a user to select a mode of the power tool 102 and can indicate to the operator of the power tool 102 the currently selected mode of the power tool 102.

The packaging 104 contains the power tool 102. Generally, the power tool 102 is inserted into or secured to the packaging 104 at the time of manufacture before being shipped or transported to a retail store or warehouse, where the power tool 102 may await sale to a consumer. When the packaging 104 contains the power tool 102, the power tool 102 is typically not configured to be operated. For example, the power tool 102 may be one or more of inaccessible, have a physical impediment to an activating trigger or button, or have no power tool battery pack coupled thereto. In some examples, the packaging 104 may include one or more of a box or housing (e.g., made of one or more of cardboard, plastic, cloth, or other materials); plastic wrap; retaining ties securing the power tool 102; polymer, extruded polystyrene or paper-based inserts for cushioning and/or positioning the power tool 102 within the packaging 104; or the like. In some examples, the packaging 104 contains the power tool 102 by entirely enclosing or housing the power tool 102. In other examples, the packaging 104 contains the power tool 102 in that the power tool 102 is secured to the packaging 104, even though the packaging 104 is at least partially opened to expose the power tool 102 to an external environment. For example, the packaging 104 may include a base panel (e.g., made of cardboard, plastic, or the like) to which the power tool 102 is secured (e.g., via retaining ties), and the power tool 102 may be exposed to the external environment. In some of these examples, a portion of the packaging 104 may still cover a portion of the power tool 102, leaving a portion of the power tool 102 exposed (e.g., the handle, the body, etc.). Thus, the packaging 104 that contains the power tool 102 may take various forms and may contain the power tool 102 in various ways including ways in which the power tool 102 is exposed, at least in part, to the external environment.

As shown in FIG. 1, the packaging interface system 101 may include a tool connector 130 (also referred to as a power tool device connector), a cable 132, a connection port 134, and a reusable communication and power adapter 136 (herein, reusable adapter 136). The tool connector 130 is configured to selectively engage with the battery pack interface 112 of the power tool 102 to electrically connect the packaging interface system 101 to the battery pack interface 112 thereby electrically connecting the packaging interface system 101 to the power tool 102. The tool connector 130 is selectively engaged with the battery pack interface 112 in that the tool connector 130 may be coupled to the battery pack interface 112 at the time of manufacture (e.g., through a sliding engagement similar to the manner in which a battery pack engages with the power tool 102) and may be removed from the battery pack interface 112 by a user (e.g., after opening the packaging 104, through a sliding disengagement similar to the manner in which a battery pack disengages the power tool 102). The cable 132 electrically connects the tool connector 130 with the connection port 134. The connection port 134 is selectively engageable with the reusable adapter 136.

In some embodiments, the tool connector 130 and the cable 132 are contained in the packaging 104, similar to the power tool 102. The connection port 134 includes an interface that is exposed to an external environment that is external to the packaging 104. For example, the packaging 104 may include a wall or panel 140 that may have an internal surface 142 and an external surface 144. At least a portion of the connection port 134 is exposed on the external surface 144 to enable the reusable adapter 136 to engage with the connection port 134, such as described in further detail with respect to FIG. 3. Thus, the connection port 134 provides an access point to connect with and communicate with the power tool 102 contained within the packaging 104, without having to remove the power tool 102 from the packaging 104.

The reusable adapter 135 is in communication with the POS device 106. The POS device 106 can be associated with a point of sale location of one or more power tools (including the power tool 102). For example, the POS device 106 can be associated with a retail store, a specific retail kiosk within the retail store, etc. The POS device 106 can be implemented in different ways. For example, the POS device 106 can be a computing device, which can include typical computing components, such as, a processor device, memory, communication systems, a display, inputs (e.g., a mouse, a keyboard, a touch screen, sensors, and the like), power sources, etc. In some cases, the computing device can take on a variety of specific forms including a desktop, a laptop, a mobile device (e.g., a tablet, or a smartphone), a server, etc. In some cases, the POS device 106 can include a computing device and other components such as, for example, a scanner (e.g., a barcode scanner) to scan barcodes or QR codes of products, a printer for printing receipts, a docking station the reusable adapter 136 (e.g., an adapter cradle), etc.

In some cases, the POS device 106 can wirelessly communicate (e.g., bidirectionally) with the reusable adapter 136 and, thereby, the packaging interface system 101 and, ultimately, the power tool 102. For example, the POS device 106 can also include a wireless module to transmit and receive wireless signals from the wireless module of the reusable adapter 136 (e.g., a Bluetooth® wireless module or a Wi-Fi wireless module). Similarly, as discussed further below, the reusable adapter 136 also can include a wireless module to transmit and receive wireless signals from the wireless module of the adapter 136 (e.g., a Bluetooth® wireless module or a Wi-Fi wireless module). However, in other cases, the POS device 106 and the reusable adapter 136 can include wired modules (e.g., a USB R module or RS-232 module) to communicate in a wired manner (see, e.g., the dashed line between the component in FIG. 1 representing a wired connection).

Regardless of the configuration of the POS device 106, the POS device 106 can cause the power tool 102 to unlock, via the packaging interface system 101. For example, the POS device 106 can transmit an instruction to the packaging interface system 101 via a wireless (or wired) communication link, and the packaging interface system 101 can, in response to receiving the instruction, cause the power tool 102 to unlock by communicating with the electronic controller of the power tool 102, via the battery pack interface 112. This process will be described in more detail below. Additionally, in some cases, including when the power tool 102 has been returned, the POS device 106 can cause the packaging interface system 101 to re-lock the power tool 102 (e.g., via a wired manner) using a similar process.

Figure 2:
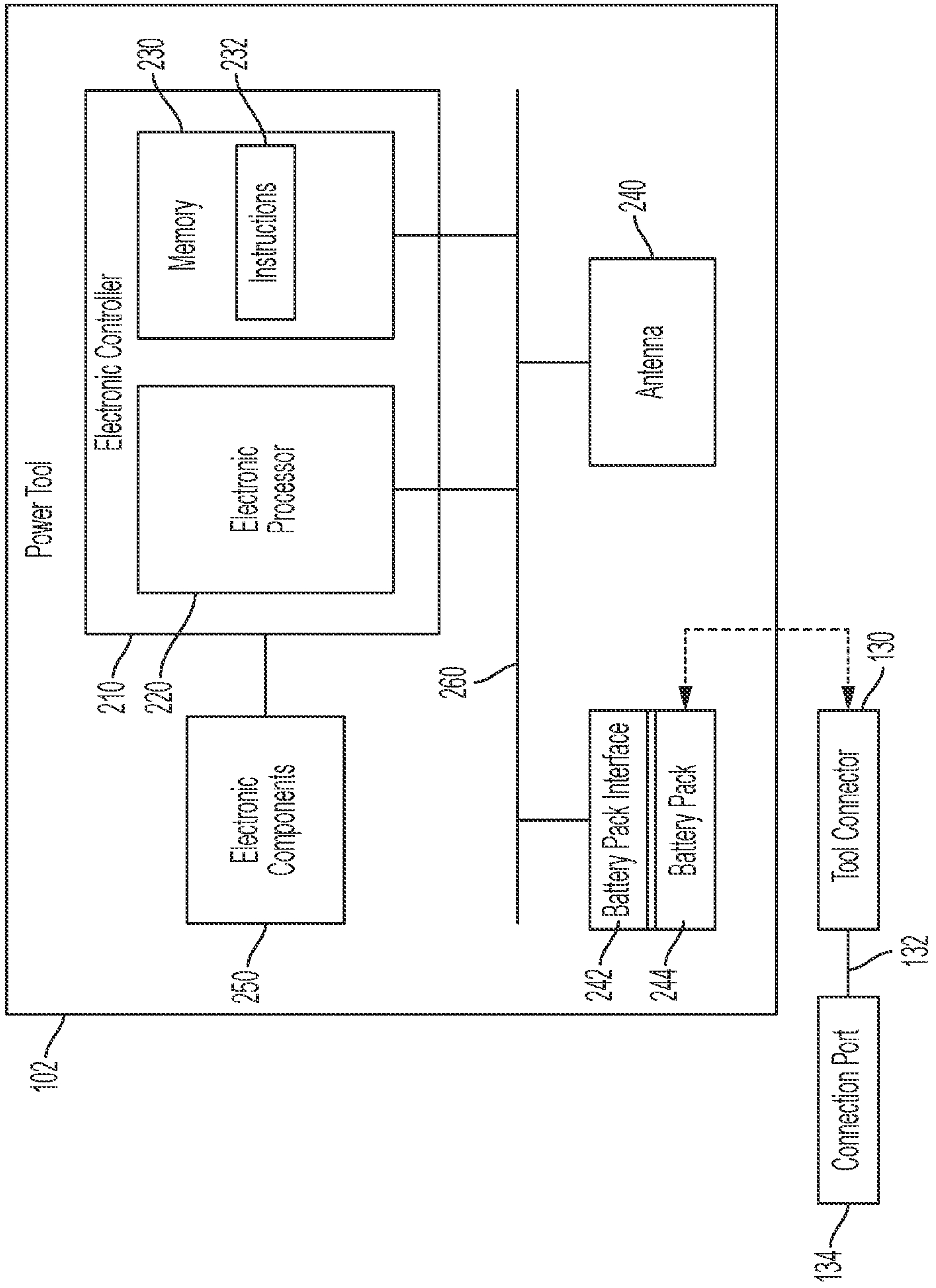
FIG. 2 shows a block diagram of a power tool of the anti-theft system of FIG. 1.

FIG. 2 shows a block diagram an example of the power tool 102. In the example illustrated, the power tool 102 can include an electronic controller 210, an antenna 240, electronic components 250, etc. The electronic controller 210 can include an electronic processor 220 and a memory 230. The electronic processor 220, the memory 230, and the antenna 240) can communicate over one or more control buses, data buses, etc., which can include a device communication bus 260. The electronic processor 220 can be configured to communicate with the memory 230 to store data and retrieve stored data. The electronic processor 220 can be configured to receive instructions and data from the memory 230 and execute, among other things, the instructions. In particular, the electronic processor 220) executes instructions stored in the memory 230. Thus, the electronic controller 210 coupled with the electronic processor 220 and the memory 230 can be configured to perform the methods described herein (e.g., the process 400 of FIG. 5).

The memory 230 can include read-only memory (ROM), random access memory (RAM), other non-transitory computer-readable media, or a combination thereof. The memory 230 can include instructions 232 for the electronic processor 220 to execute. The instructions 232 can include software executable by the electronic processor 220 to enable the electronic controller 210 to, among other things, receive and process security commands to thereby unlock the power tool 102 and lock the power tool 102.

The antenna 240) can be communicatively coupled to the electronic controller 210. The antenna 240 enables the electronic controller 210 (and, thus, the power tool 102) to communicate with other devices, such as a cellular tower, a Wi-Fi router, a mobile device, other power tools, etc. In some embodiments, the power tool 102 can include a power tool battery pack interface 242 (e.g., a specific implementation of the battery pack interface 112) that is configured to selectively receive and interface with a power tool battery pack 244 (or the tool connector 130 in place of the battery pack 244). The battery pack interface 242 can include one or more power terminals and, in some cases, one or more communication terminals that interface with respective power terminals, communication terminals, etc., of the power tool battery pack 244 (and of the tool connector 130). The power tool battery pack 244 can include one or more (e.g., multiple) battery cells of various chemistries, such as lithium-ion (Li-Ion), nickel cadmium (Ni-Cad), etc. The power tool battery pack 244 can further selectively latch and unlatch (e.g., with a spring-biased latching mechanism) to the power tool 102 to prevent unintentional detachment. The power tool battery pack 244 can further include a pack electronic controller (pack controller) including a processor and a memory. The pack controller can be configured similarly to the electronic controller 210 of the power tool 102. The pack controller can be configured to regulate charging and discharging of the battery cells, and/or to communicate with the electronic controller 210. In some embodiments, the power tool battery pack 244 can further include an antenna, similar to the antenna 240, coupled to the pack controller via a bus similar to bus 260. Accordingly, the pack controller, and thus the power tool battery pack 244, can be configured to communicate with other devices, such as the cellular tower, the Wi-Fi router, the mobile device, or other power tools. In some embodiments, the memory of the pack controller can include the instructions 232. The power tool battery pack 244 can further include, for example, a charge level fuel gauge, analog front ends, sensors, etc.

The power tool battery pack 244 can be coupled to and configured to power the various components of the power tool 102, such as the electronic controller 210, the antenna 240, and the electronic components 250. However, to simplify the illustration, power line connections between the battery pack 244 and these components are not illustrated. In addition, the packaging interface system 101 that engages, via the tool connector 130, with the battery pack interface 242 in place of the battery pack 244, can also provide power to some of the components of the power tool 102. For example, a battery of the packaging interface system 101 can be configured to provide power to the electronic controller 210 of the power tool 102. In some cases, this power may be provided at a level that is insufficient to power other electronic components of the power tool 102, including, for example, the electronic components 250) (e.g., a motor, pump, lighting element, audio element, etc.).

In some embodiments, the power tool 102 can also optionally include electronic components 250). For a motorized power tool (e.g., drill-driver, saw, etc.), the electronic components 250 can include, for example, an inverter bridge, a motor (e.g., brushed or brushless) for driving a tool implement, etc. For a non-motorized power tool (e.g., a worksite light, a work radio, ruggedized tracking device, etc.), the electronic components 250) can include, for example, one or more of a lighting element (e.g., an LED), an audio element (e.g., a speaker), a power source, etc. In some embodiments, the antenna 240 can be within a separate housing along with the electronic controller or another electronic controller, and that separate housing selectively attaches to the power tool 102. For example, the separate housing may attach to an outside surface of the power tool 102 or may be inserted into a receptacle of the power tool 102. Accordingly, the wireless communication capabilities of the power tool 102 can reside in part on a selectively attachable communication device, rather than integrated into the power tool 102. Such selectively attachable communication devices can include electrical terminals that engage with reciprocal electrical terminals of the power tool 102 to enable communication between the respective devices and enable the power tool 102 to provide power to the selectively attachable communication device. In other embodiments, the antenna 240) can be integrated into the power tool 102. In some embodiments of the power tool 102, the antenna 240) is not included (i.e., the antenna 240 is not integrated into the power tool 102 or coupled to terminals of the power tool 102).

Figure 3:
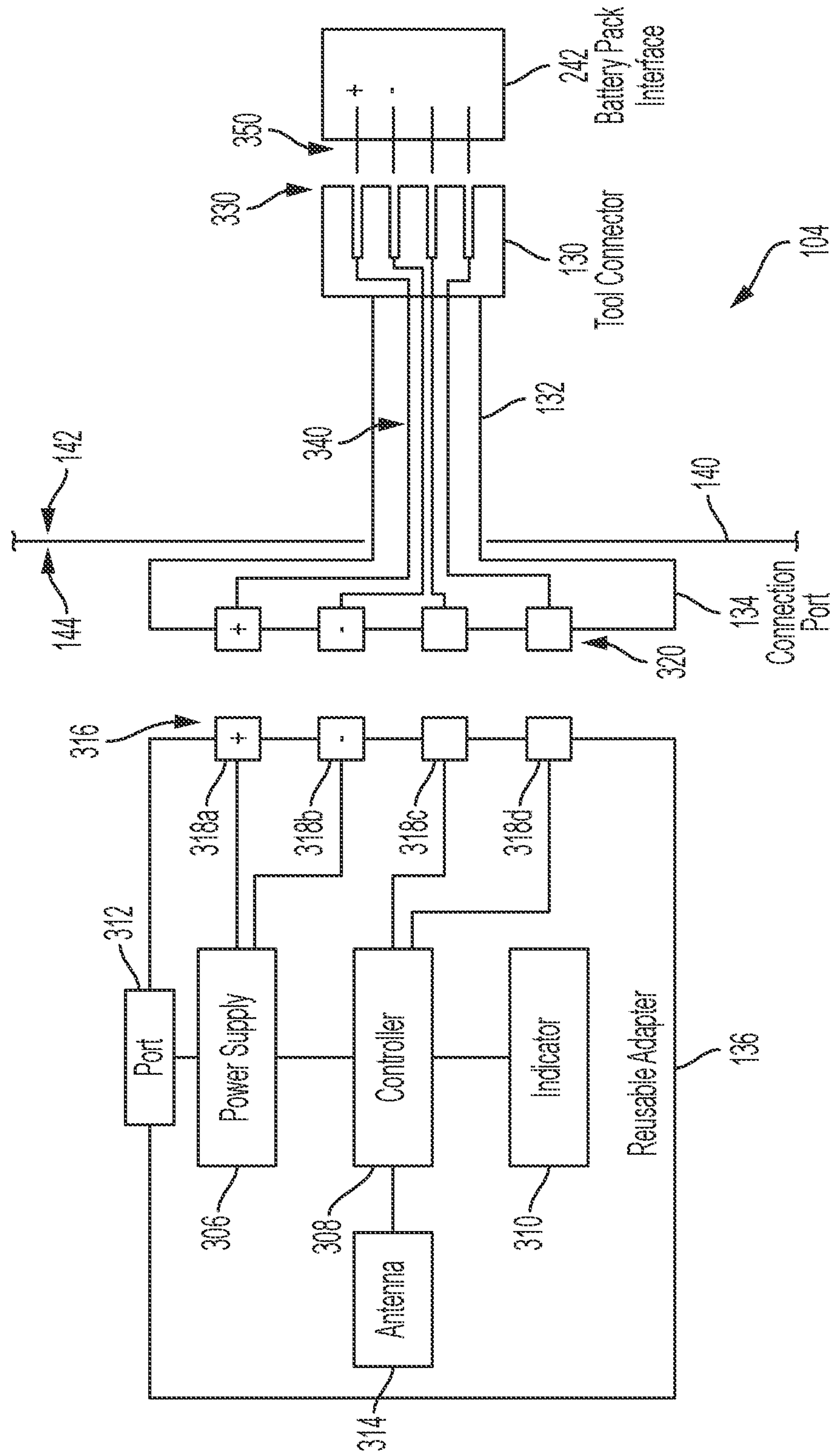
FIG. 3 shows a diagram of a packaging interface system of the anti-theft system of FIG. 1.

FIG. 3 shows a schematic illustration of the battery pack interface 242 of the power tool 302 and an example of the packaging interface system 101 including examples of the tool connector 130, the cable 132, the connection port 134, and the reusable adapter 136. In FIG. 3, the reusable adapter 136 includes a power supply 306, an electronic controller 308 (interface controller 308), an indicator 310, a (wired) port 312, an antenna 314, and adapter terminals 316. The packaging interface system 101 illustrated in FIG. 3 is merely an example and, in some embodiments, the packaging interface system 101 includes additional or fewer components and/or a different organization of components. For example, in some embodiments of the reusable adapter 136, the port 312 is provided, but the antenna 314 and/or the power supply 306 are not included. In other embodiments, the reusable adapter 136 includes the antenna 314 and the power supply 306, but not the port 312.

The power supply 306 may include one or more battery cells configured to power some (or all) of the components of the reusable adapter 136 and, in some cases, components of the power tool 102 (e.g., the electronic controller 210). In some cases, the one or more battery cells of the power supply 306 can be rechargeable (e.g., configured to be recharged), such as via the port 312, while in other cases, the one or more battery cells can be non-rechargeable (e.g., not configured to be recharged). In some cases, the power supply 306 can advantageously include a single battery cell (e.g., a coin cell, an AA battery, a D battery, etc.), which can provide a compact design. In some embodiments, the battery of the power supply 306 can be a high-capacity battery, such as, for example, a lithium-ion battery, a nickel cadmium battery, a zinc-carbon battery, a zinc-chloride battery, etc., which can prolong usage of the power supply 306. The power supply 306 may further include power conditioning components, such as DC-to-DC converters, filters, and the like, configured to receive power, whether from local battery cells of the power supply 306 or via an external source via the wired port 312, and provide the conditioned power to the components of the reusable adapter 136 and/or the power tool 102.

The interface controller 308 may be similar to the electronic controller 210 in that it may include an electronic processor and memory, where the processor is configured to retrieve instructions from the memory and execute the instructions to implement or control the functionality of the reusable adapter 136 described herein.

The indicator 310 may include one or more of a light (e.g., one or more light emitting diodes (LEDs)) and a speaker. The indicator 310 may provide feedback and information to an operator (e.g., a cashier), such as whether the adapter 136 is powered (e.g., via on-board battery cells of the power supply 306 or via the port 312), whether an error or fault has been encountered by the adapter 136, whether a security command has been received from the POS device 106, whether the security command has been transmitted to the power tool 102 via the packaging interface system 101, whether the security command has been successfully received and executed by the power tool 102, and the like.

The antenna 314 may be similar to the antenna 240 of the power tool 102 and may enable the reusable adapter 136 (e.g., the interface controller 308) to communicate wirelessly with the POS device 106. For example, the interface controller 308 and the antenna 314 can be a wireless communication module, such as a Bluetooth® wireless module (e.g., the BGM13S Bluetooth® wireless module made available by Silicon Labs, Austin TX, USA).

As noted above with respect to FIG. 1, in some examples, the reusable adapter 136 communicates with the POS device 106 via a wired connection. As an example, with respect to FIG. 3, the interface controller 308 may communicate with the POS device 106 via the wired port 312. Additionally, the POS device 106 may provide power to the reusable adapter 136 via this wired port 312 (and the power supply 306).

The interface terminals 316 may include power terminals 318*a-b* and communication terminals 318*c-d*. Although the interface terminals 316 are illustrated as including four terminals (two power terminals and two communication terminals), in some embodiments, a different number of terminals are provided.

As noted above with respect to FIG. 1, the reusable adapter 136 may be selectively engaged to the connection port 134. When engaged, the interface terminals 316 engage with port terminals 320 of the connection port 134. Although not separately labeled, the port terminals 320 of the connection port 134 may similarly include two power terminals and two communication terminals. In this example, the port terminals 320 are electrically connected to respective connector terminals 330 of the tool connector via respective conductors or wires 340 of the cable 132. As noted above with respect to FIG. 1, the tool connector 130 may be selectively engaged to the battery pack interface 242. When engaged, the connector terminals 330 engage with pack interface terminals 350 of the battery pack interface 242.

Although not illustrated in FIG. 3, in some embodiments, the connection port 134 is secured to the wall 140 of the packaging 104 via adhesive between the external surface 144 and a back surface of the connection port 134 or via a backing plate secured to the cable 132 to sandwich the wall 140 between the connection port 134 and the backing plate. Although also not illustrated in FIG. 3, in some embodiments, the reusable adapter 136 or the power supply 306 includes power switching devices (e.g., transistors, field effect transistors, bipolar junction transistors, relays, etc.) that the interface controller 308 controls to selectively enable a connection between the power supply 306 and the power terminals 318*a-b*.

Figure 4A:
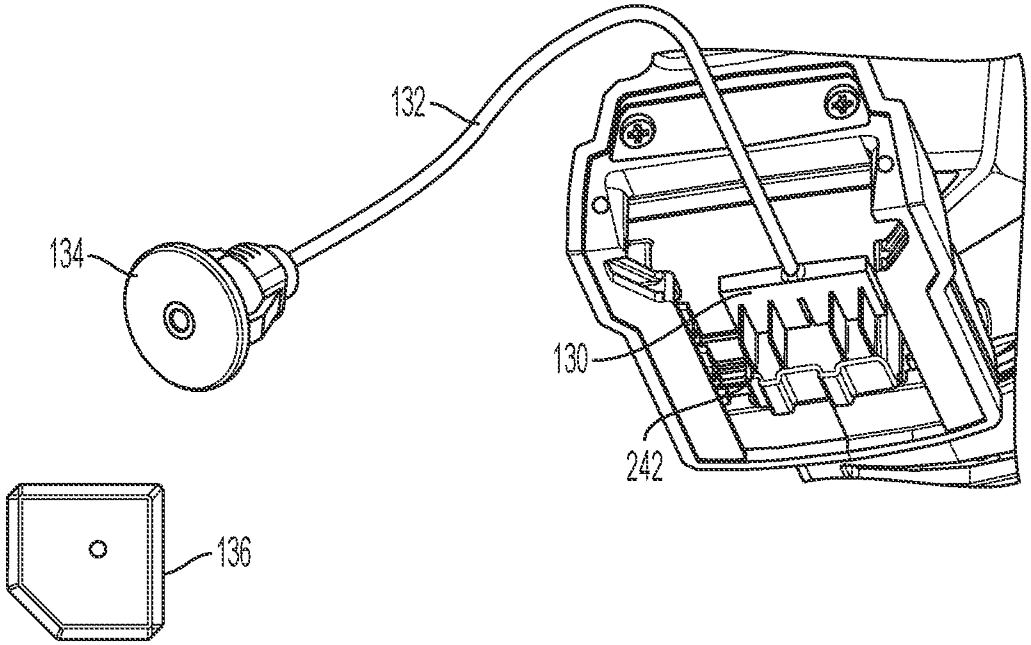
FIGS. 4A-C shows aspects of a packaging interface system of embodiments of the anti-theft system of FIG. 1.
Figure 4B:
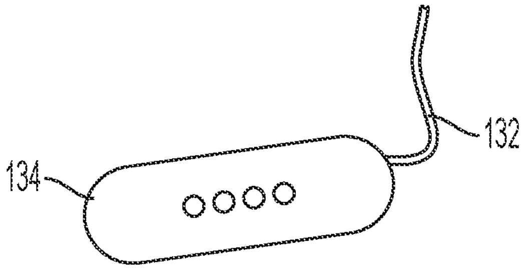
Figure 4C:
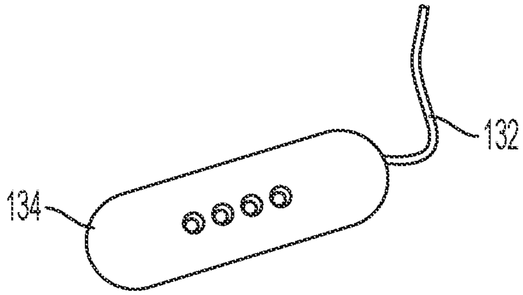

The particular terminal interfaces and physical forms of the adapter 136, connection port 134, the tool connector 130, and/or the battery interface 242 may vary. FIGS. 4A-C illustrate just some examples of these interfaces and physical forms. FIG. 4A shows an illustration of an example of the battery pack interface 242 of the power tool 102 and components of the packaging interface system 101. In particular, FIG. 4 shows the tool connector 130 coupled to the battery pack interface 242, the cable 132, and the connection port 134. Although not illustrated in FIG. 4, the adapter 136 may include a jack that is insertable into the shown receptacle of the connection port 134, where the jack and receptacle include the respective terminals of the adapter 136 and the connection port 134 (e.g., the terminals 316 and 320). FIGS. 4B and 4C illustrate other examples of the connection port 134, identified as connection port 402 and connection port 404, respectively. The connection port 402 of FIG. 4B includes spring-biased pins, sometimes referred to as pogo-pins, that are configured to interface with reciprocal terminals on the reusable adapter 136, which may take the form of the terminals of the connection port 404 shown in FIG. 4C. When the connection port 404 is used, the adapter 136 may have reciprocal terminals that take the form of the spring-biased pins of the connection port 402 of FIG. 4B.

Figure 5B:
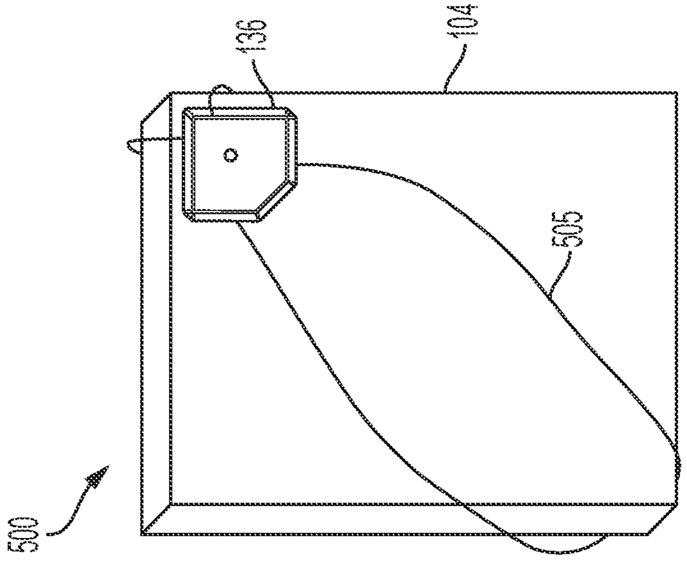
FIG. 5B shows a package containing a power tool and a reusable adapter connected to a connection port of a packaging interface system.
Figure 5A:
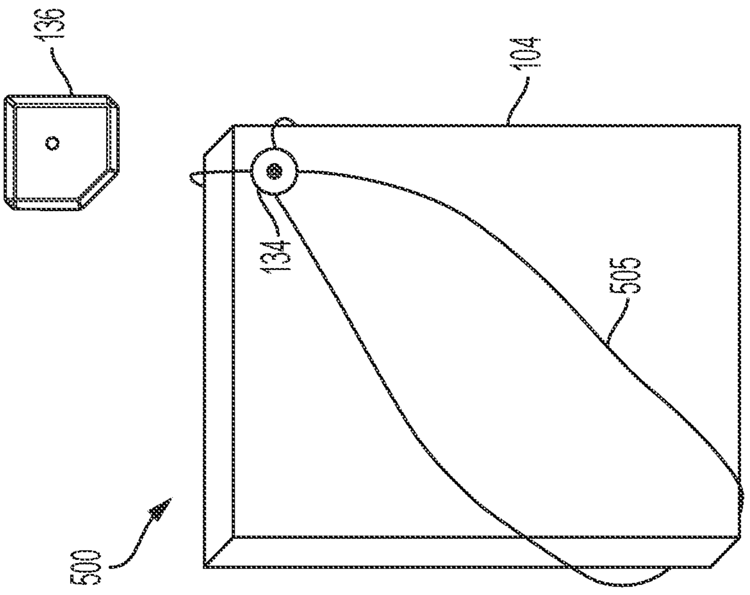
FIG. 5A shows a package containing a power tool and a resusable adapter disconnected from a connection port of a packaging interface system.

FIGS. 5A-B illustrate a system 500 including an example embodiment of the packaging 104 and of the packaging interface system 101. In FIG. 5A, the system 500 includes packaging 104 with a connection port 134 (of a packaging interface system 101) exposed to an external environment of the packaging 104, and a reusable adapter 136 that is disengaged from the connection port 134 and the packaging 104. In FIG. 5A, the reusable adapter 136 is engaged with the connection port 134, obscuring the connection port 134 from view in FIG. 5B. Although the packaging 104 of the system 500 is illustrated as a box that encloses the power tool 102 that it contains, as noted, in other embodiments, the packaging 104 may take other forms, including forms in which a portion of the power tool 102 is exposed to the external environment.

In the example of the system 500, the connection port 134 is integrated with or further secured to the packaging 104 via a selectively removable security wrap 505, sometime referred to as a spider wrap, that includes one or more cables (e.g., made of nylon, steel, or another material), a cable retainer, and an alarm unit. After a verified purchase, for example, a cashier may remove the security wrap 505 with a special-purpose tool that interfaces with the cable retainer (e.g., to enable extension or retraction of the cables) and/or alarm unit. In some examples, the alarm unit generates an alarm (e.g., with lights and/or sound) in response to one of the cables of the security wrap 505 being cut or the security wrap 505 otherwise being tampered with. In some examples, the security wrap 505 is secured to or integrated with the reusable adapter, as shown in FIG. 5B, rather than the connection port 134. The security wrap 505 of FIG. 5B may otherwise function as discussed with respect to FIG. 5A.

Figure 5C:
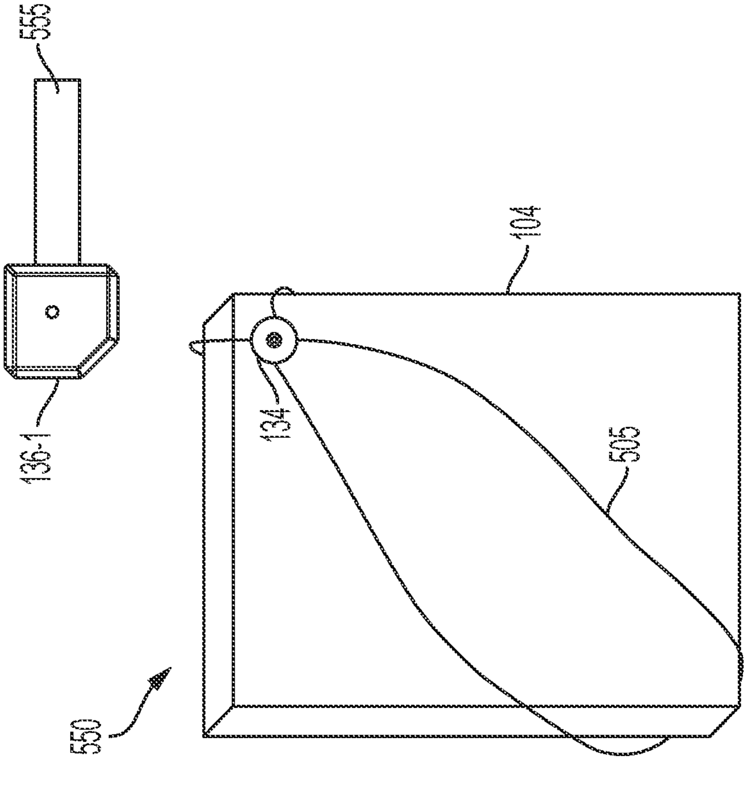
FIG. 5C shows a package containing a power tool and another reusable adapter disconnected from a connection port of a packaging interface system.

FIG. 5C illustrates a system 550 with another example embodiment of the packaging 104 and of the packaging interface system 101. In FIG. 5C, the system 550 includes packaging 104 with a connection port 134 (of a packaging interface system 101) exposed to an external environment of the packaging 104, and a reusable adapter 136-1. The reusable adapter 136-1 is another example of the reusable adapter 136, and is similar to the reusable adapter 136 of FIGS. 5A-B, except that the reusable adapter 136-1 includes a handle 555. In FIG. 5C, like FIG. 5A, the reusable adapter 136-1 is disengaged from the connection port 134 and the packaging 104. However, the reusable adapter 136-1 may engage the connection port 134, similar to the system 500 as shown in FIG. 5B. Although the packaging 104 of the system 550) is illustrated as a box that encloses the power tool 102 that it contains, as noted, in other embodiments, the packaging 104 may take other forms, including forms in which a portion of the power tool 102 is exposed to the external environment. As illustrated in FIG. 5C, the packaging 104 may similarly include the security wrap 505, whether attached to the connection port 134 (as shown), the reusable adapter 136-1, or another portion of the packaging 104.

Figure 6:
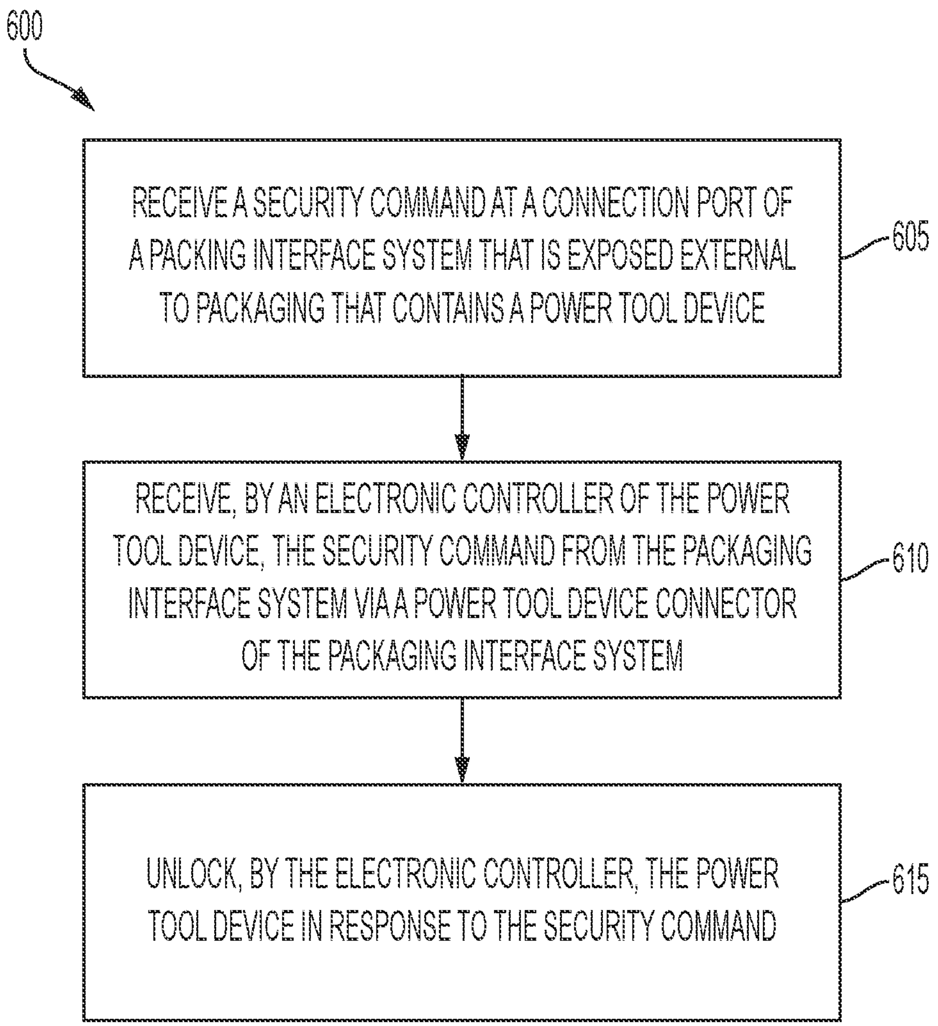
FIG. 6 shows a flowchart of a process for activating a power tool device following a verified power tool purchase.

FIG. 6 shows a flowchart of a process 600 for activating a power tool device following a verified power tool device purchase, which can be implemented using any of the systems described herein (e.g., the various embodiments of the anti-theft system 100 described herein). The power tool device may be a power tool (e.g., the power tool 102) or a power tool battery pack (e.g., the power tool battery pack 244 or the power tool battery pack 802 (see FIG. 8)). The process 600 is generally described with reference to the anti-theft system 100. However, in some embodiments, the process 600 can be implemented by another system (e.g., the anti-theft system 800 of FIG. 8) having additional components, fewer components, alternative components, etc. Additionally, although the blocks of the process 600 are illustrated in a particular order, in some embodiments, one or more of the blocks can be executed partially or entirely in parallel, can be executed in a different order than illustrated in FIG. 6, or can be bypassed.

In block 605, a connection port of a packaging interface system that is exposed external to packaging that contains a power tool device receives a security command. For example, the connection port 134 receives the security command, where the connection port 134 is exposed external to the packaging 104 that contains the power tool 102, as described in various embodiments above. In some examples, the reusable adapter 136 provides the security command to the connection port 134 in response to a communication from the POS device 106. The POS device 106 may transmit the communication, wirelessly or via a wired link, to the reusable adapter 136 in response to verifying a purchase of the power tool 102, which may be indicated to the POS device 106 by, for example, a cashier operating the POS device 106 or a transaction system in communication with the POS device 106. The communication from the POS device 106 may include the security command. The security command may include one or more of an unlock command for the power tool 102, a verification code or password associated with the power tool 102, and/or an identifier of the power tool 102. In some examples, before the adapter 136 receives the communication from the POS device 106, the adapter 136 establishes a wireless communication or wired communication link with the POS device 106 (e.g., via a handshaking process of the communicating protocol used by the devices).

In block 610, an electronic controller of the power tool device receives the security command from the packaging interface system via a tool connector of the packaging interface system. For example, the electronic controller 210 of the power tool 102 may receive the security command from the packaging interface system 101 via the tool connector 130. For example, after the connection port 134 receives the security command, the connection port 134 may then forward the security command (entirely or in part) to the battery interface 242 via the cable 132 and tool connector 130. In some examples, the security command is forwarded directly along a conductive link formed by conductors and terminals of the connection port 134, cable 132, and tool connector 130 to the battery interface 242, such as shown in the example of FIG. 3. In other examples, an indirect link is provided wherein an intermediary device that is incorporated into the connection port 134, cable 132, and/or tool connector 130 (e.g., a controller or controllers as discussed with respect to FIGS. 7A-B), receives the security command and forwards the security command to the battery interface 242 via the tool connector 130.

In block 615, the electronic controller of the power tool device unlocks the power tool device in response to the security command. For example, the electronic controller 210 unlocks the power tool 102 in response to the security command received via the battery interface 242. For example, prior to the electronic controller 210 receiving the security command, the power tool 102 can be in a locked state, in which the power tool 102 is unable to rotate (or translate) the actuator of the power tool or generally perform its main tool function (e.g., driving, drilling, cutting, sanding, crimping, providing worksite lighting, etc.). For example, in the locked state, the electronic controller 210 may inhibit such operations by not generating control signals to implement such operations (e.g., essentially ignoring activation of a trigger). That is, in some embodiments, when the power tool 102 operates according to the locked state, some (or all) of the functions of the power tool 102 are prevented from being activated (e.g., by the electronic controller 210).

As noted above, the security command may include one or more of an unlock command for the power tool 102, a verification code or password associated with the power tool 102, and/or an identifier of the power tool 102. In some embodiments, the transmission and reception of the security command between any two components in the anti-theft system 100 (e.g., from POS device 106 to reusable adapter 136, from reusable adapter 136 to tool connector 130, and/or from tool connector to battery interface 242) may occur over multiple communications. For example, receiving the security command in block 605 and/or 610 may include receiving an unlock command of the security command in a first communication and receiving a password in a second communication. Alternatively, receiving the security command in block 605 and/or 610 may include receiving an unlock command and password combined into a single communication. Alternatively, receiving the security command in block 605 and/or 610 may include receiving an unlock command (without separate password) in a single communication. The tool identifier may not be included in some examples of the security command, may be received in a separate communication from other components of the security command (e.g., unlock command and/or password), or in combination with each communication of the security command.

In embodiments in which a password (also referred to as a passcode) is included as part of the security command, the electronic controller 210 of the power tool 102 can receive the passcode and can determine whether the received passcode matches a stored passcode (e.g., in a memory of the power tool 102, such as the memory 230). In this case, when the electronic controller 210 determines that the received passcode matches the stored passcode, the power tool 102 can execute the block 615 to unlock (e.g., switch states from the locked state to the unlocked state). However, when the electronic controller 210 determines that the received passcode is different than the stored passcode, the electronic controller 210 can prevent the power tool from unlocking (e.g., despite receiving an unlock command). In other words, the power tool 102 can remain in the locked state. In some examples, the passcode is encrypted by the POS device 106 or the packaging interface system 101 (e.g., a controller thereof) and the electronic controller 210 decrypts the (encrypted) passcode before comparing the (decrypted) passcode to the stored passcode. In some embodiments, the passcode serves as the unlock command, and a separate unlock command (without passcode) is not provided to the power tool 102.

Although the process 600 is described in terms of unlocking the power tool 102, a similar process may be used to lock the power tool 102. For example, the security command received in blocks 605 and 610 may include or indicate a lock command, rather than an unlock command. Then, in block 615, the electronic controller 210 locks the power tool 102 (e.g., causes the power tool 102 to enter a locked state) in response to the security command.

In some embodiments, in addition to a security command, the reusable adapter 136 provides power to the packaging interface system 101 and, ultimately, to the electronic controller 210 of the power tool 102. For example, in block 605, in addition to receiving the security command, the connection port 134 may receive power from the reusable adapter 136. For example, with reference to FIG. 3, (i) the security command may be transmitted via the communication terminals 318*c* and 318*d* and received by the communication terminals of the terminals 320 of the connection port 134, and (ii) power may be transmitted via the power terminals 318*a* and 318*b* and received by the power terminals of the terminals 320 of the connection port 134. Then, in block 610, the electronic controller 210 may receive the power, via power terminals of the battery interface 242 that receive the power from the cable 132 and tool connector 130, and may receive the security command via communication terminals of the battery interface 242 that receive the security command from the cable 132 and tool connector 130. As described above, in some embodiments, the packaging interface system 101 provides direct coupling from the terminals of the connection port 134 to the terminals 330 of the tool connector 130 via conductors, while in other embodiments, an intermediary component (e.g., a controller or controllers) is provided. In the case of the intermediary component, the packaging interface system 101 may still provide a direct coupling for the power terminals. Alternatively, packaging interface system 101 may have one or more power switching elements that the intermediary component may control to selectively make and break the direct connection and, thereby, selectively provide power received at the connection port 134 to the battery interface 242.

In some embodiments, when the power tool is unlocked in block 615, the electronic controller 210 sends a control signal to cause an electro-mechanical switch or relay to activate to cause release of the security wrap 505 of the packaging 104 (see FIGS. 5A-C). In some embodiments, after the security command is transmitted by the reusable adapter 136, the reusable adapter sends a control signal to cause an electro-mechanical switch or relay to activate to cause release of the security wrap 505 of the packaging 104.

After unlocking the power tool 102 via the process 600, the tool connector 130 may disconnect from the battery interface 242, and the power tool 102 may receive a battery pack (e.g., the battery pack 244, which may include multiple battery cells) at the battery pack interface 242 of the power tool. Then, the electronic controller 210 of the power tool 102 may receive an activation input (e.g., in response to a trigger or button of the power tool 102 being depressed). In response, the electronic controller 210 may control or actuate the power tool 102 (e.g., rotating or translating an actuator of the power tool 102) in a typical manner.

In the case of the power tool not being successfully unlocked via the process 600 (e.g., when an invalid passcode or no unlock command is transmitted), the power tool 102 may remain in the locked state and may be prevented from operating even when the battery pack 244 is attached to the power tool 102.

Advantageously, in the anti-theft system 100 and process 600, the reusable adapter 136 may be reused by a retail store, cashier, etc. to unlock and/or lock a plurality of power tools over time. Additionally, because the reusable adapter 136 is external to the packaging 104, the power supply 306 of the reusable adapter 136 can have any battery cells recharged or replaced as needed. Further, because the reusable adapter 136 may provide power to the power tool 102 via the packaging interface system 101, the packaging 104 can be left unopened during a purchase and unlocking process, and the power tool 102 does not need to be packaged, transported, or stored with a power source to enable the electronic controller 210 to communicate. In contrast, a power source that is integrated into a power tool may have a charge level diminishing over time, potentially to levels at which unlocking process cannot be performed without further intervention, such as opening the packaging 104. Further, at least in some embodiments, the only single-use components of the anti-theft system 100 may be the small, low-cost components of the packaging interface system 101.

Figure 7A:
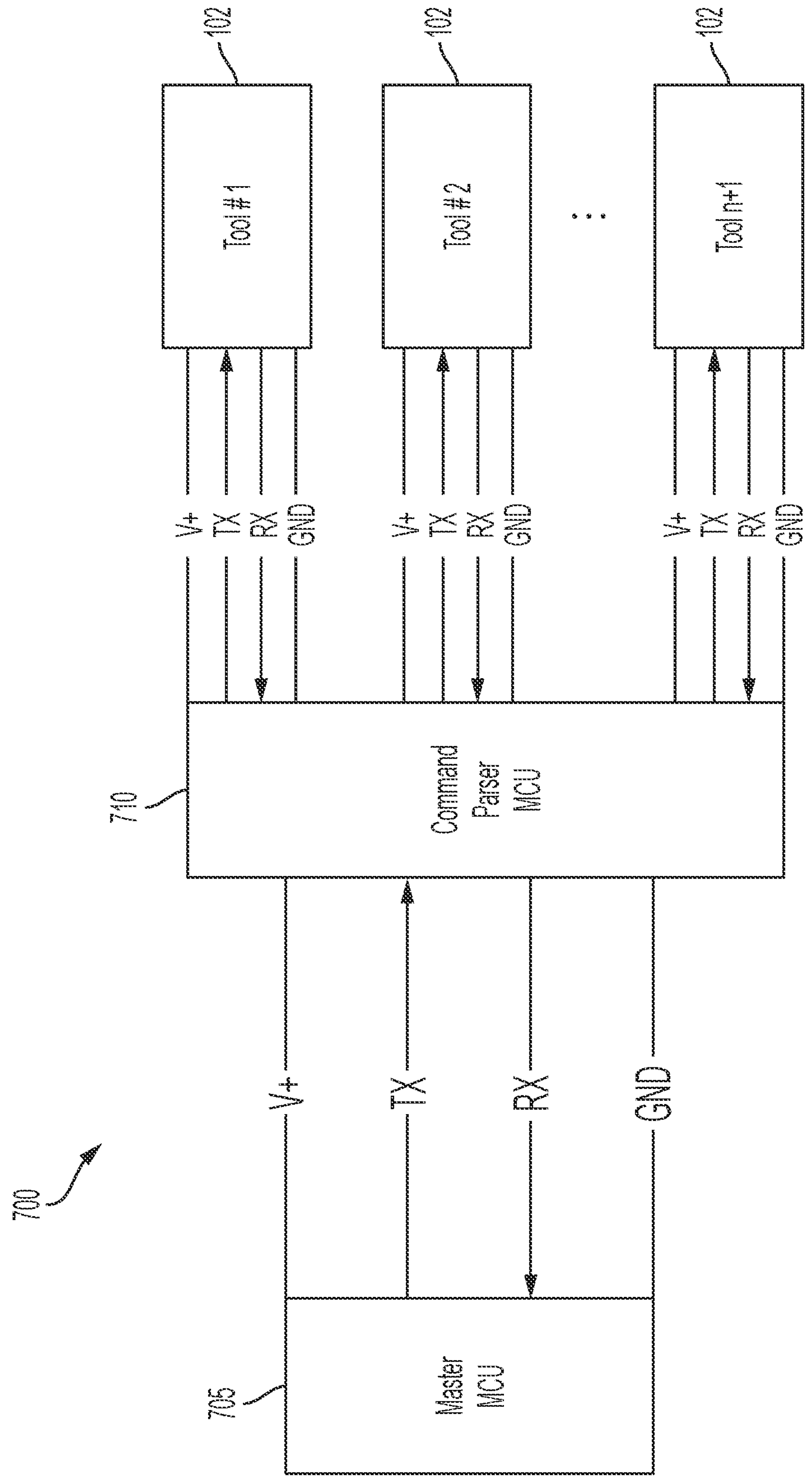
FIG. 7A shows aspects of a packaging interface system for use in a multi-tool package.
Figure 7B:
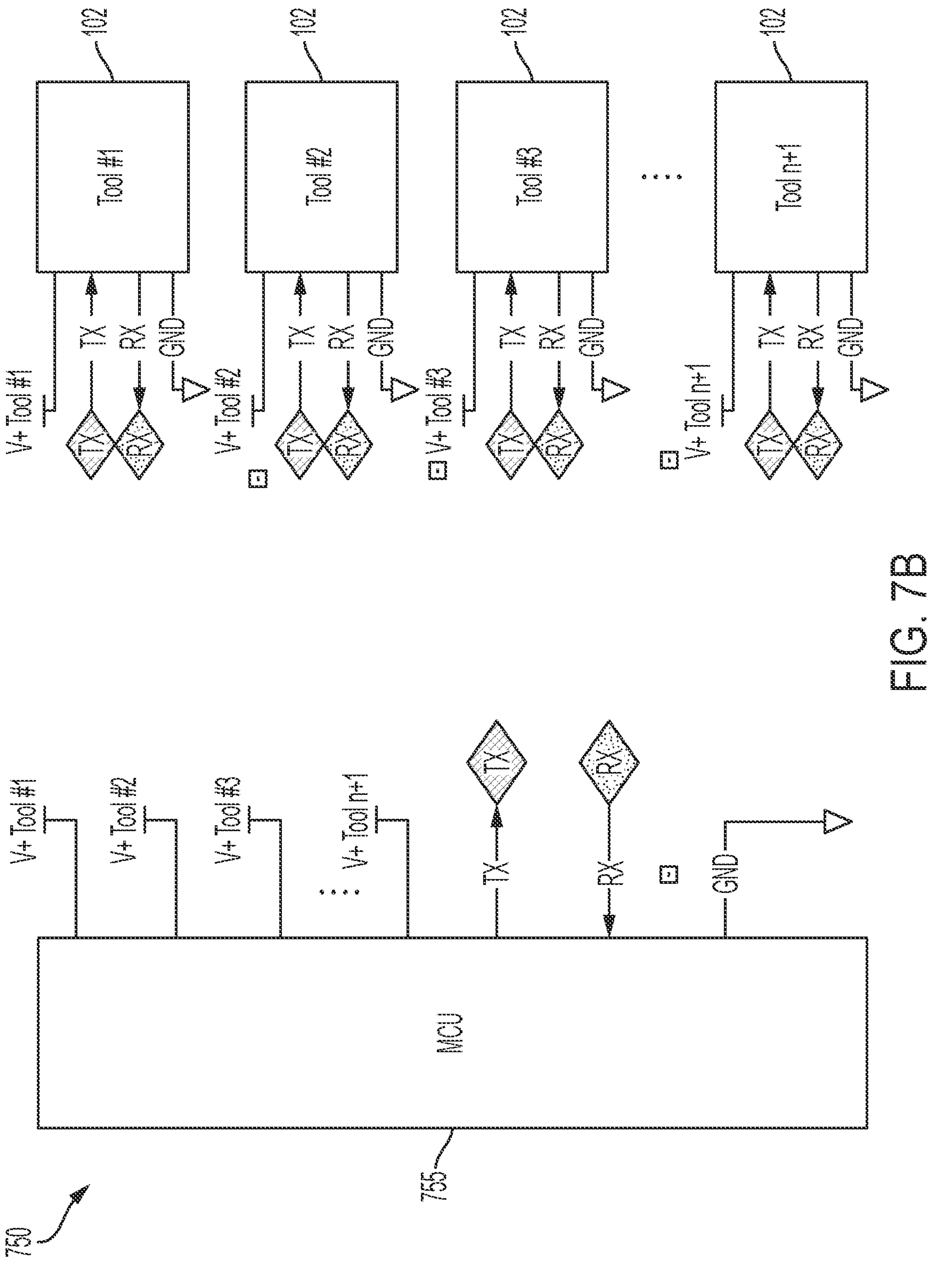
FIG. 7B shows aspects of another packaging interface system for use in a multi-tool package.

FIGS. 7A and 7B illustrate aspects of embodiments of a packaging interface system for use in a multi-tool package. FIG. 7A illustrates a security command parsing system 700 that may be incorporated into some embodiments of the anti-theft system 100 in which the packaging 104 includes multiple power tools 102. The system 700 includes a master electronic controller 705 (also referred to as a master MCU 705) coupled to a command parser electronic controller 710 (also referred to as a command parser MCU 710) via power lines (e.g., V+ and V−) and communication lines (e.g., transmit line "TX" and receive line "RX"). The command parser MCU 710 is then coupled to each of the power tools 102 contained by the packaging 104 (i.e., each of the n+1 power tools 102 illustrated in FIG. 7A). For example, the command parser MCU 710 may be coupled by separate power and communication lines to each respective power tool 102, as illustrated in FIG. 7A.

In some embodiments, the master MCU 705 is within the reusable adapter 136 and serving as the interface controller 308, while the command parser MCU 710 is downstream of the terminals 320 of the connection port 134 (e.g., within the connection port 134, or positioned within a housing communicatively between the connection port 134 and the tool connector 130). The command parser MCU 710 (and, thus, the connection port 134 or housing containing the command parser MCU 710) may then be coupled via respective cables 132 and associated tool connectors 130 to each power tool 102. In other embodiments, both the master MCU 705 and the command parser MCU 710 are provided within the adapter 136 (upstream of the terminals 320 of the connection port 134), and the connection port 134 includes additional terminals to accommodate the connections to each power tool 102 via a respective cable 132 and tool connector 130. In other embodiments, both the master MCU 705 and the command parser MCU 710 are provided downstream of the communication terminals 320 (e.g., within the connection port 134, or within a housing communicatively between the connection port 134 and the tool connector 130). In these embodiments, the command parser MCU 710 (and, thus, the connection port 134 or housing containing the command parser MCU 710) may again be coupled via respective cables 132 and associated tool connectors 130 to each power tool 102.

The system 700 enables communication to multiple power tools 102 contained by the packaging 104 in parallel. In particular, communications (or messages) between the master MCU 705 and the command parser 710, whether intended to be sent to one of the power tools 102 or having been received from one of the power tools 102, may include a tool identifier. The tool identifier may include one or more bits or bytes of data that identify one of the power tools 102 in the packaging 104. Accordingly, the tool identifier serves as a destination address or sender address, depending on the direction of communication. The command parser MCU 710 may receive a communication intended for delivery to one of the power tools 102, as indicated by the tool identifier of the communication. The command parser MCU 710 may then (1) identify for which one of the power tools 102 the communication is intended (based on the tool identifier); (2) edit the communication to remove any additional information not used by the power tool 102 (e.g., the tool identifier); (3) power the electronic controller 210 of the identified power tool 102 (via the power terminals for that power tool 102) for communication; and (4) forward the communication to the powered, identified power tool 102. For communications that the command parser MCU 710 receives from the power tools 102, the command parser MCU 710 may (1) identify from which power tool 102 the communication is received (e.g., based on which communication terminals the communication is received); (2) edit the communication to add the tool identifier for the identified power tool 102; (3) forward the communication (with tool identifier) to the master MCU 705.

By using the command parser MCU 710, additional address information (e.g., the tool identifier) that is not typically used in (or incompatible with) a communication protocol of the power tool 102 may be stripped out such that communications ultimately between the command parser MCU 710 and the power tools 102 use the communication protocol of the power tool 102 (e.g., without a tool identifier included in the communication).

In embodiments of the anti-theft system 100 that include the system 700, the anti-theft system 100 may execute the process 600 using the system 700 to provide security commands to each of the power tools 102 within the packaging 104 (e.g., to unlock or lock the power tools). For example, in block 605 of FIG. 6, the command parser MCU 710 may receive the security command that is received at the connection port 134. For example, the master MCU 705, whether as part of the adapter 136, the connection port 134, or another position between the connection port 134 and the parser MCU 710, may provide the security command to the parser MCU 710. The security command may include a tool identifier (e.g., one or more bits or bytes of data that identifies one of the power tools 102 in the packaging 104). Then, the parser MCU 710 may identify the power tool 102 indicated by the tool identifier, edit the security command to remove the tool identifier, power the power tool 102 indicated by the tool identifier, and transmit the edited security command (with the tool identifier removed) to the power tool 102 indicated by the tool identifier. In block 610, the electronic controller 210 of the power tool 102 indicated by the tool identifier may receive the edited security command. In block 615, the electronic controller 210 may unlock the power tool in response to receiving the edited security command. Further, blocks 605, 610, and 615 may be repeated for each of the power tools 102 contained by the packaging 104. In some embodiments, the security command for each power tool 102 has a unique passcode that is associated with the particular power tool 102. In this case, the tool identifier is used at least in part to ensure that each security command (with unique passcode) is provided to the appropriate power tool 102 for unlocking. In some embodiments, each of the power tools 102 may respond to the master MCU 705 (via the command parser MCU 710 as previously discussed) to indicate when that particular power tool 102 has been unlocked or whether the unlocking was unsuccessful.

FIG. 7B illustrates a security command parsing system 750 that may be incorporated into some embodiments of the anti-theft system 100 in which the packaging 104 includes multiple power tools 102. The system 750 includes an electronic controller 755 (also referred to as a communication controller or an MCU 755). The MCU 755 is coupled to each of the power tools 102 contained by the packaging 104 (i.e., each of the n+1 power tools 102 illustrated in FIG. 7B). In particular, the MCU 755 is coupled by a shared ground line and communication lines (e.g., receive line "RX" and transmit line "TX") to each of the power tools 102, but is coupled by a separate (not shared) positive voltage (V+) power line to each respective power tool 102, as illustrated in FIG. 7B.

In some embodiments, the MCU 755 is part of the packaging interface system 101 downstream of the terminals 320 of the connection port 134 (e.g., within the connection port 134, or positioned within a housing communicatively between the connection port 134 and the tool connector 130). The MCU 755 (and, thus, the connection port 134 or housing containing the MCU 755) may then be coupled via respective cables 132 and associated tool connectors 130 to each power tool 102. In other embodiments, the MCU 755 is provided within the adapter 136 (upstream of the terminals 320 of the connection port 134), and the connection port 134 includes additional terminals to accommodate the connections to each power tool 102 via a respective cable 132 and tool connector 130.

The system 750 enables communication to multiple power tools 102 contained by the packaging 104 sequentially by selectively powering the power tools 102 via the separate power lines. For example, the MCU 755 may receive a communication intended for delivery to one of the power tools 102. The MCU 755 may then (1) identify for which one of the power tools 102 the communication is intended; (2) power the electronic controller 210 of the identified power tool 102 (via the power terminal for that power tool 102) for communication; and (3) transmit the communication to the powered, identified power tool 102. For communications that the command the MCU 755 receives from the power tools 102, the MCU 755 may (1) identify from which power tool 102 the communication is received (e.g., based on which power line is currently being powered); and (2) process and/or forward the communication as appropriate.

As described further below, in some embodiments, a communication is intended for all of the power tools 102 (e.g., a security command to unlock the power tools 102), rather than a particular one of the power tools 102, and the MCU 755 sequentially provides this communication to each power tool 102, one after the other. As also described further below, in some embodiments, communications are intended for particular power tools 102 (e.g., security commands with unique passcodes for each power tool 102), but the MCU 755 is not aware of the particular power tool 102 for which each communication is intended (e.g., no tool identifier is used with the communications).

In embodiments of the anti-theft system 100 that include the system 750, the anti-theft system 100 may execute the process 600 using the system 750 to provide security commands to each of the power tools 102 within the packaging 104 (e.g., to unlock or lock the power tools). For example, in block 605 of FIG. 6, the MCU 755 may receive the security command that is received at the connection port 134. For example, the MCU 755 may receive the security command (or respective security commands with unique passcodes for each of the power tools 102) from the reusable adapter 136. The MCU 755 may then transmit the security command (or respective security commands) to each power tool 102 in the packaging 104. In block 610, the electronic controller 210 of each of the power tools 102 may receive the security command or respective security command from the MCU 755. In block 615, the electronic controller 210 of each power tool 102 may unlock the power tool 102 in response to receiving the security command (or respective security command). As noted above, communications between the MCU 755 and the power tools 102 may occur in a sequential manner, one-at-a-time. Accordingly, blocks 605, 610, and 615 may be performed iteratively for each of the power tools 102 contained by the packaging 104.

In some embodiments, each of the power tools 102 in the packaging 104 is associated with the same passcode. In such embodiments, the MCU 755 may receive the security command in block 605. Then, the MCU 755 may, one-by-one, power each power tool 102 and transmit the security command to the powered power tool 102. Thus, one-by-one, the electronic controller 210 of each power tool 102 may receive the security command (block 610) and unlock the power tool 102 (block 615). The MCU 755 may wait for a confirmation from the power tool 102 that the power tool 102 has unlocked, or a predetermined amount of time, before proceeding to power the next power tool 102 in sequence and transmit the security command. Accordingly, the process may loop between blocks 610 and 615 for each power tool 102 of the packaging 104.

In some embodiments, each of the power tools 102 in the packaging 104 is associated with a unique passcode, but the MCU 755 is not aware of which passcode is associated with which power tool 102. In such embodiments, in block 605, the MCU 755 may receive each of the security commands for the power tools 102 in the packaging 104. Then, the MCU 755 may, one-by-one, power each power tool 102 and transmit each of the security commands to the power tool 102. Thus, one-by-one, the electronic controller 210 of each power tool 102 may receive all of the security commands collectively including all of the unique passcodes (block 610). Among these security commands will be the security command with the unique passcode associated with that particular power tool 102. In response, the electronic controller 210 unlocks the power tool 102 (block 615). The MCU 755 may await for a confirmation from the power tool 102 that the power tool 102 has unlocked, or a predetermined amount of time, before proceeding to power the next power tool 102 in sequence and transmit the security commands to that next power tool 102. Accordingly, the process may loop between blocks 610 and 615 for each power tool 102 of the packaging 104, providing all of the security commands (with all of the unique passcodes) to each of the power tools 102.

In some embodiments in which each of the power tools 1202 is associated with a unique passcode, the MCU 755 may detect when a particular security command successfully unlocks a power tool 102 (e.g., based on an acknowledgment communication from the power tool 102). Then, the MCU 7555 may skip or bypass sending that security command to the remaining power tools 102 because the associated passcode is now known to be associated with a particular power tool 102 that has already been locked (and will necessarily not be associated with one of the not-yet-unlocked power tools 102).

Although the embodiments of FIGS. 7A-7B are described in terms of unlocking the plurality of power tools 102, these embodiments may similarly be used to lock the power tools 102. For example, the security command received by the packaging interface system 101 and power tools 102 may include or indicate a lock command, rather than an unlock command. Then, the electronic controllers 210 may lock the respective power tools 102 in which the electronic controllers 210 reside (e.g., causing the power tools 102 to enter a locked state) in response to the security command.

Figure 8:
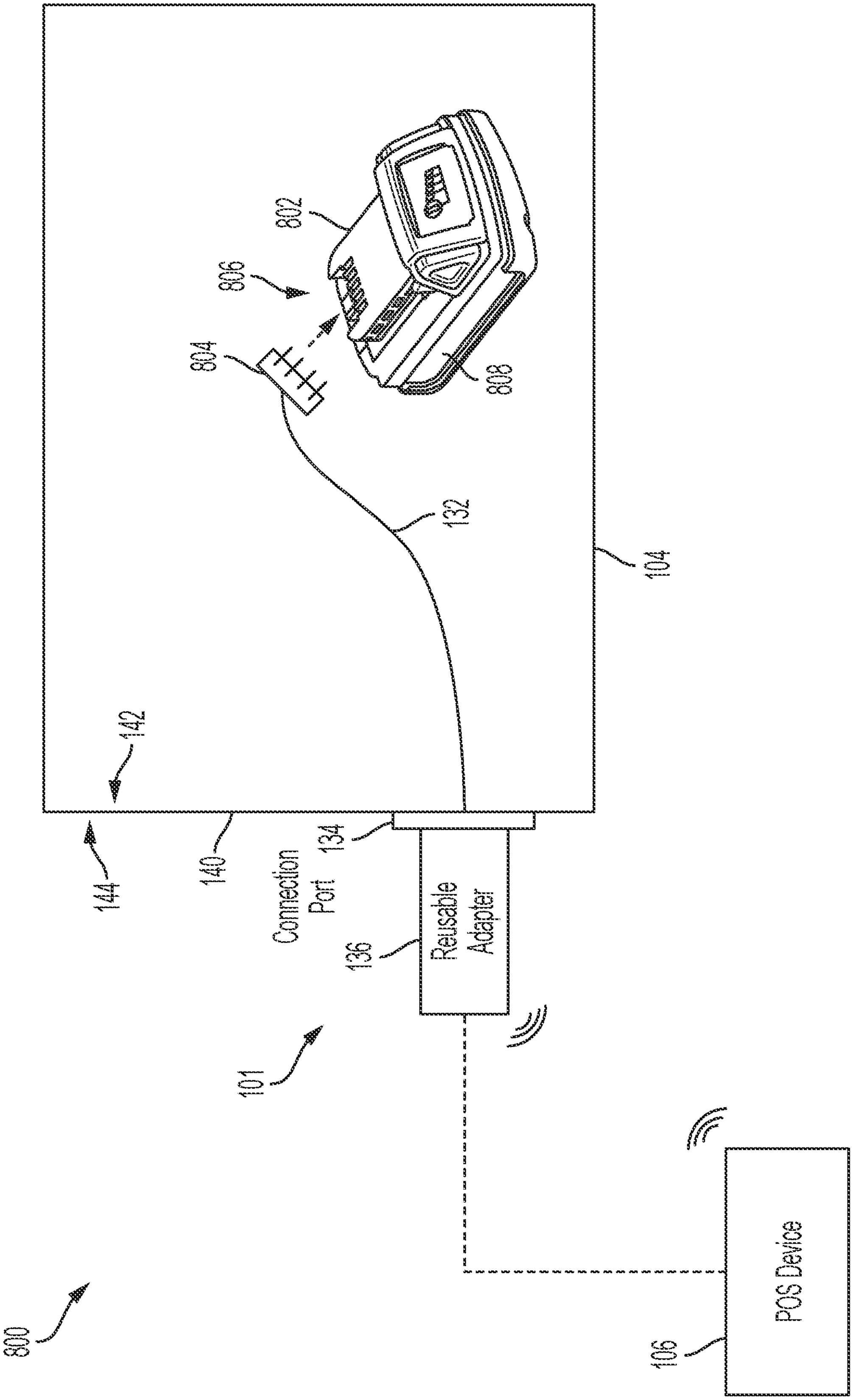
FIG. 8 is a schematic illustration of another anti-theft system including a packaging interface system.

Although the embodiments discussed above may be described in terms of interfaces, packaging, and techniques for unlocking or locking power tools, in some examples, similar concepts are applied to one or more power tool battery packs. For example, FIG. 8 illustrates an anti-theft system 800, which includes similar components as the system 100 of FIG. 1 identified by like reference numerals, except that a power tool battery pack 802 and pack connector 804 are included in place of the power tool 102 and the tool connector 130. The power tool battery pack 802 includes a tool interface 806 and a body 808 housing one or more battery cells. The power tool battery pack 802 may be selectively coupled to and power a power tool, such as the power tool 102 described herein. The power tool battery pack 802 is an example of the power tool battery pack 244 described above (e.g., with respect to FIG. 2) and, accordingly, the description of the power tool battery pack 244 similarly applies to the power tool battery pack 802. The pack connector 804 (also referred to as a power tool device connector) may be similar to the tool connector 130 except being configured to interface with the power tool battery pack 244, rather than the power tool 102. Accordingly, while the tool connector 130 is configured to interface with the battery pack interface 242 of the power tool 102, the pack connector 804 is configured to interface with a tool interface 806 of the battery pack 802 (also referred to as a terminal interface).

In some examples, the anti-theft system 800 may execute the process 600 to provide security commands to the battery pack 802 within the packaging 104 (e.g., to unlock or lock the battery pack 802). In such examples, in block 610, an electronic controller of the battery pack 802 (rather than of the power tool 102) may receive the security command from the packaging interface system via a pack connector 804 (rather than the tool connector 130) of the packaging interface system. Further, in block 615, the electronic controller of the battery pack 802 may unlock the battery pack 802 in response to the security command. For example, prior to the electronic controller of the battery pack 802 receiving the security command, the battery pack 802 can be in a locked state, in which the battery pack 802 is unable to output power to a power tool 102 to enable it to rotate (or translate) the actuator of the power tool or generally perform its main tool function (e.g., driving, drilling, cutting, sanding, crimping, providing worksite lighting, etc.). For example, in the locked state, the electronic controller of the battery pack 802 may inhibit such operations by not generating control signals to implement such operations (e.g., essentially ignoring requests from power from the power tool 102). That is, in some embodiments, when the battery pack 802 operates according to the locked state, some (or all) of the functions of the battery pack 802 are prevented from being activated (e.g., by the electronic controller of the battery pack 802). For example, a power switching element (e.g., a field effect transistor) positioned between the battery cells and an output power terminal of the battery pack 802 may be controlled to be open (i.e., an OFF state or not conducting) by the controller of the battery pack 802, or not controlled to be closed (i.e., not controlled to be in an ON state or conducting). Once unlocked in response to the security command and coupled to a power tool 102, the controller of the battery pack 802 may permit the discharge of power from the battery pack 802 to the power tool 102 (e.g., in response to a request from the power tool 102 received over the tool interface 806). Upon receipt of a security command, as part of block 615, the battery pack 802 may determine whether to unlock or remain locked using similar techniques as described with respect to the power tool 102 and block 615 above (e.g., using a passcode or password, pack identifier, etc.).

Although the process 600 is described above in terms of unlocking the battery pack 802, a similar process may be used to lock the battery pack 802. For example, the security command received in blocks 605 and 610 may include or indicate a lock command, rather than an unlock command. Then, in block 615, the electronic controller of the battery pack 802 locks the battery pack 802 (e.g., causes the battery pack 802 to enter a locked state) in response to the security command.

In some examples, the packaging 104 of the anti-theft system 100 and/or 800 includes two or more battery packs 802 that may be unlocked and/or locked using the techniques provided herein (e.g., with respect to process 600). In such examples, the packaging may include one or more pack connectors 804 (e.g., one connected to each respective battery pack 802). The packaging 104 may further include a respective connection port 134 for each pack connector 804 and battery pack 802, or may include a shared connection port 134. When the connection port 134 is shared among multiple devices, the packaging 104 may further include a command parser MCU 710 and operate as described with respect to FIGS. 7A-7B.

In some examples, the packaging 104 of the anti-theft system 100 and/or 800 includes a combination of one or more power tools 102 and one or more battery packs 802 that may be unlocked and/or locked using the techniques provided herein (e.g., with respect to process 600). In such examples, the packaging may include one or more tool connectors 130 (e.g., one connected to each respective power tool 102) and one or more pack connectors 804 (e.g., one connected to each respective battery pack 802). The packaging 104 may further include a respective connection port 134 for each power tool 102 and for each battery pack 802, or may include a shared connection port 134. When the connection port 134 is shared among multiple devices, the packaging 104 may further include a command parser MCU 710 and operate as described with respect to FIGS. 7A-7B.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including." "comprising." or "having" and variations thereof herein is meant to encompass the items listed thereafter and equivalents thereof as well as additional items. Unless specified or limited otherwise, the terms "mounted," "connected." "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top." "front," or "back" features is generally intended as a description only of the orientation of such features relative to a reference frame of a particular example or illustration. Correspondingly, for example, a "top" feature can sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components can be consolidated and performed by a single component. Similarly, the functions described herein as being performed by one component can be performed by multiple components in a distributed manner. Additionally, a component described as performing particular functionality can also perform additional functionality not described herein. For example, a device or structure that is "configured" in a certain way is configured in at least that way, but can also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications can be made to these configurations without departing from the scope or spirit of the claimed subject matter.

Certain operations of methods according to the disclosure, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first." "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions can be used to discuss aspects of a particular example or figure, but do not necessarily require similar orientation or geometry in all installations or configurations.

As used herein, unless otherwise defined or limited, the phase "and/or" used with two or more items is intended to cover the items individually and the items together. For example, a device having "a and/or b" is intended to cover; a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A power tool system comprising:
- a power tool device including:
  - a body,
  - a terminal interface coupled to the body, and
  - an electronic controller coupled to the body; and
- packaging containing the power tool device; and
- a packaging interface system including:
  - a connection port exposed external to the packaging, the connection port configured to receive a security command, and
  - a power tool device connector selectively engaged with the terminal interface and providing a communication path between the connection port and the terminal interface, wherein the electronic controller of the power tool device is configured to:
  - receive the security command from the packaging interface system via the power tool device connector; and
  - unlock the power tool device in response to the security command.

2. The power tool system of claim 1, the connection port further configured to receive power and to provide the power to the electronic controller via the power tool device connector and the terminal interface.

3. The power tool system of claim 1, the packaging interface system further including a reusable adapter, the reusable adapter configured to be connected to the connection port and to provide the security command for the electronic controller to the connection port.

4. The power tool system of claim 3, wherein the reusable adapter includes a power supply and is configured to provide power for the electronic controller to the connection port.

5. The power tool system of claim 3, wherein the reusable adapter is configured to communicate with a point of sale (POS) device to receive the security command.

6. The power tool system of claim 1, wherein
- the power tool device is a first power tool device of a plurality of power tool devices contained by the packaging,
- the security command is a first security command of a plurality of security commands, the power tool device connector is a first power tool device connector of a plurality of power tool device connectors of the packaging interface system, and each power tool device connector of the plurality of power tool device connectors is selectively engaged with a respective power tool device of the plurality of power tool devices via a respective terminal interface of the plurality of power tool devices to provide a respective communication path between the connection port and the respective terminal interface.

7. The power tool system of claim 6, wherein the packaging interface system includes a master controller and a command parser controller, the master controller configured to:

provide the security commands to the command parser controller, each security command including a respective power tool device identifier that identifies a respective power tool device of the plurality of power tool devices;

the command parser controller configured to:

provide power to the plurality of power tool devices via the plurality of power tool device connectors; and forward each of the security commands to the respective power tool device identified by the respective power tool device identifier of each of the security commands, each forwarded security command having the respective power tool device identifier removed.

8. The power tool system of claim 6, wherein the packaging interface system includes a communication controller that includes shared communication lines that are shared among each of the plurality of power tool device connectors and associated power tool devices, the communication controller configured to:

sequentially, for each respective power tool device of the plurality of power tool devices, provide power to the respective power tool device via the respective power tool device connector coupled to the respective power tool device, and provide a respective security command of the plurality of security commands over the shared communication lines to the respective power tool device via the respective power tool device connector coupled to the respective power tool device.

9. The power tool system of claim 8, wherein each of the plurality of security commands has a unique password associated with one of the plurality of power tool devices.

10. The power tool system of claim 8, wherein each of the plurality of security commands has a same password that is common across each of the plurality of power tool devices.

11. The power tool system of claim 1, wherein the power tool device is a power tool or a power tool battery pack.

12. A method for activating a power tool device, the method comprising:

receiving, by a connection port of a packaging interface system, a security command, the connection port exposed external to packaging that contains the power tool device, the power tool device including a body, a terminal interface, and an electronic controller;

receiving, by the electronic controller, the security command from the packaging interface system via a power tool device connector of the packaging interface system, the power tool device connector selectively engaged with the terminal interface and providing a communication path between the connection port and the terminal interface; and unlocking, by the electronic controller, the power tool device in response to the security command.

13. The method of claim 12, further comprising:

receiving, by the connection port, power; and providing, by the connection port, the power to the electronic controller via the power tool device connector and the terminal interface.

14. The method of claim 12, further comprising:

providing, by a reusable adapter of the packaging interface system, the security command for the electronic controller to the connection port.

15. The method of claim 14, further comprising:

providing, by a power supply of the reusable adapter, power for the electronic controller to the connection port.

16. The method of claim 14, further comprising:

receiving, from a point of sale (POS) device, the security command.

17. The method of claim 12, wherein the power tool device is a first power tool device of a plurality of power tool devices contained by the packaging, the security command is a first security command of a plurality of security commands, the power tool device connector is a first power tool device connector of a plurality of power tool device connectors of the packaging interface system, and each power tool device connector of the plurality of power tool device connectors is selectively engaged with a respective power tool device of the plurality of power tool devices via a respective terminal interface of the plurality of power tool devices, the method further comprising:

providing, by each power tool device connector, a respective communication path between the connection port and the terminal interface to which the power tool device connector is engaged.

18. The method of claim 17, wherein the packaging interface system includes a master controller and a command parser controller, the method further comprising:

providing, by the master controller the security commands to the command parser controller, each security command including a respective power tool device identifier that identifies a respective power tool device of the plurality of power tool devices;

providing, by the command parser controller, power to the plurality of power tool devices via the plurality of power tool device connectors; and forwarding, by the command parser controller, each of the security commands to the respective power tool device identified by the respective power tool device identifier of each of the security commands, each forwarded security command having the respective power tool device identifier removed.

19. The method of claim 17, wherein the packaging interface system includes a communication controller that includes shared communication lines that are shared among each of the plurality of power tool device connectors and associated power tool devices, the method further comprising:

sequentially, for each respective power tool device of the plurality of power tool devices, providing, by the communication controller, power to the respective power tool device via the respective power tool device connector coupled to the respective power tool device, and providing, by the communication controller, a respective security command of the plurality of security commands over the shared communication lines to the respective power tool device via the respective power tool device connector coupled to the respective power tool device.

20. The method of claim 19, wherein each of the plurality of security commands has a unique password associated with one of the plurality of power tool devices.

* * * * *